T. DURANT & C. H. HANNOVER.
STEAM TRAP.
APPLICATION FILED NOV. 14, 1912.
1,113,207.
Patented Oct. 13, 1914.
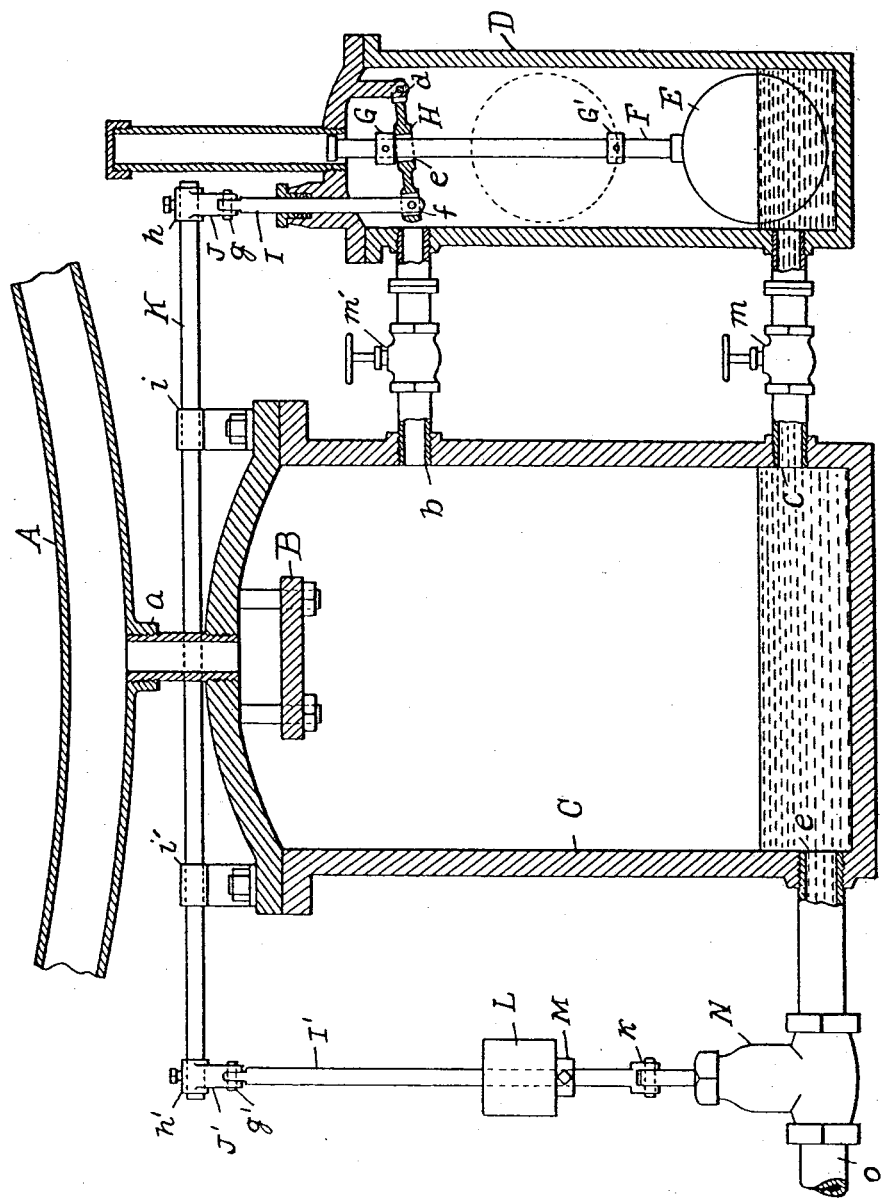
WITNESSES:
Jo. Baily Brown
J. Herbert Bradley.
Thomas Durant
Charles H. Hannover
INVENTORS
By
F.W.H. Clay
Their Atty

UNITED STATES PATENT OFFICE.

THOMAS DURANT, OF McKEES ROCKS, AND CHARLES H. HANNOVER, OF PITTSBURGH, PENNSYLVANIA.

STEAM-TRAP.

1,113,207.  Specification of Letters Patent.  Patented Oct. 13, 1914.

Application filed November 14, 1912.  Serial No. 731,342.

*To all whom it may concern:*

Be it known that we, THOMAS DURANT and CHARLES H. HANNOVER, citizens of the United States, residing at McKees Rocks and Pittsburgh, respectively, in the State of Pennsylvania, have invented certain new and useful Improvements in Steam-Traps, of which the following is a specification.

Our invention relates to that class of traps designed to automatically remove from steam mains the water caused by condensation of the steam therein; and the primary objects of our invention are to provide apparatus which may be attached to any previously used form of steam trap as well as to one especially designed for use with our attachment, which will automatically empty the chamber provided for collecting the water, then close the outlet valve and keep it closed until the chamber is again full; and to render more certain and efficient the operation of steam traps.

We are aware that it has been the practice to have traps to collect water from steam mains, and to provide means for automatically emptying them. This has been done by use of a float inside the trap chamber itself, so that in order to repair the mechanism it has been necessary to entirely remove the trap and open it. Also in the prior art it has been the custom to so construct the devices used for emptying the trap chambers that there was a constant leakage rather than a complete emptying and refilling, and this has resulted in "wire-drawing" the discharge valves,—to their rapid deterioration. Our device is designed to avoid these defects. It may be attached to steam traps already in place. The operating mechanism may be cut off from the main chamber by valves provided for that purpose and then removed for repair without shutting off the trap itself, or stopping its collection of water from the steam main.

We attain these objects by means of the apparatus of which an example is shown in the accompanying drawing, which is a vertical section of the entire device.

A is any steam main, to which at a low point $a$ is attached the steam trap C. To this main chamber C by means of two pipes, $b$ and $c$, we attach our operating mechanism. These pipes are provided with valves, $m$, $m'$, which allow the operating apparatus to be cut off and removed for repair without removing or cutting off the flow to the trap itself. Although we have shown the float-containing chamber D and the outlet O on opposite sides of the main chamber, it will be understood that this is for convenience of illustration only, and the attachments may be made at any convenient point.

The operation of our device is as follows: Water collected in the steam main flows over the baffle B into the main chamber C of the trap. As it rises in that chamber the open pipes $c$ and $b$ keep the water at the same level in the auxiliary chamber D. In the latter we provide a float E fixed on the stem F, which is provided with two collars, G, G', properly spaced apart. As the water level rises toward the top of the chambers the float and stem also rise, the collar G' is forced against the small lever H, which is pivoted at $d$, and pivotally attached at $f$ to stem I, which in turn is pivotally attached to rigid rocker arm J of the torsion bar K, supported on the trap C at $i$, $i'$. By this means the upward movement of the float turns the torsion bar when the trap becomes full. The other end of the bar carries an arm J' linked to stem I'; by means of which a pull is translated to open the valve N and allow the trap to empty through outlet O, by steam pressure. N is a valve of the dashpot type, and we provide a collar M on the stem I' so that weights L may be adjusted to render the valve as nearly balanced as possible and therefore easily opened and closed. As soon as the water level in the large chamber C drops, that in the auxiliary chamber D follows at approximately the same rate; the float goes down with it, but as the stem F works loosely through opening $e$ in lever H, there is no downward pull on H until the collar G descends to that point; then the water being drawn from beneath the float allows the weight of the float and its stem to bear down on lever H; this force is translated through the torsion bar as was the upward force and operates to close the outlet valve N. By this means the valve is opened and closed at the extremity of the movement of the float, and is not affected by its intermediate motion, and thereby we attain a normal condition of a closed outlet valve, and a complete filling then a complete emptying of the trap.

Having thus described our invention and illustrated its use, we claim:

In a steam trap the combination of a main collection chamber, a connection to a steam main, an outlet valve, a detachable auxiliary chamber so connected to the main chamber that water will stand at the same level in both, a float in the auxiliary chamber, a shaft fixed to the float, collars on the shaft adapted to engage a pivoted lever only at the extremity of movement of the float, said pivoted lever, connections from the lever to the outlet valve whereby the valve will be opened when the float reaches the top of the auxiliary chamber and closed when the float reaches the bottom of auxiliary chamber, substantially as and for the purposes described.

In testimony whereof we have hereunto signed our names in the presence of the two subscribed witnesses.

THOMAS DURANT.
CHARLES H. HANNOVER.

Witnesses:
Jo. BAILY BROWN,
FREDK. STAUB.

---

Copies of this patent may be obtained for five cents each, by addressing the "Commissioner of Patents, Washington, D. C."